US008200403B2

(12) United States Patent
Heap et al.

(10) Patent No.: US 8,200,403 B2
(45) Date of Patent: Jun. 12, 2012

(54) METHOD FOR CONTROLLING INPUT TORQUE PROVIDED TO A TRANSMISSION

(75) Inventors: Anthony H. Heap, Ann Arbor, MI (US); Wilfried Brunssen, Ypsilanti, MI (US); Bin Wu, Troy, MI (US); Brian R Medema, Waterford, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 825 days.

(21) Appl. No.: 12/239,870

(22) Filed: Sep. 29, 2008

(65) Prior Publication Data
US 2009/0118926 A1 May 7, 2009

Related U.S. Application Data

(60) Provisional application No. 60/984,928, filed on Nov. 2, 2007.

(51) Int. Cl.
*G06F 7/00* (2006.01)
(52) U.S. Cl. .......... 701/54; 701/22; 701/51; 701/84; 701/93; 701/55; 477/109; 477/111; 477/114; 477/120; 180/197; 180/233; 180/248
(58) Field of Classification Search .......... 701/54, 701/51, 22, 70, 84, 93, 55, 87, 90; 477/3, 477/5, 114; 180/197, 248, 233
See application file for complete search history.

(56) References Cited

U.S. PATENT DOCUMENTS

| | | | |
|---|---|---|---|
| 5,855,533 A * | 1/1999 | Tolkacz et al. ............ 477/110 |
| 6,832,148 B1 | 12/2004 | Bennett |
| 6,868,318 B1 | 3/2005 | Cawthorne |
| 7,154,236 B1 | 12/2006 | Heap |
| 2004/0249525 A1 | 12/2004 | Okoshi et al. |
| 2005/0076958 A1 | 4/2005 | Foster |
| 2005/0077867 A1 | 4/2005 | Cawthorne |
| 2005/0077877 A1 | 4/2005 | Cawthorne |
| 2005/0080523 A1 | 4/2005 | Bennett |
| 2005/0080527 A1 | 4/2005 | Tao |
| 2005/0080535 A1 | 4/2005 | Steinmetz |
| 2005/0080537 A1 | 4/2005 | Cawthorne |
| 2005/0080538 A1 | 4/2005 | Hubbard |
| 2005/0080539 A1 | 4/2005 | Hubbard |
| 2005/0080540 A1 | 4/2005 | Steinmetz |
| 2005/0080541 A1 | 4/2005 | Sah |
| 2005/0182526 A1 | 8/2005 | Hubbard |
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |

(Continued)

*Primary Examiner* — Thomas Black
*Assistant Examiner* — Luke Huynh (57) ABSTRACT

A method for controlling an input torque provided to a transmission includes executing a first iterative search within a first range of permissible torque values to determine a first torque value based on a first cost value. The first cost value is based on a first set of powertrain measurements measured at a first time. A second cost value based on a second torque value and the first set of powertrain measurements measured at the first time is calculated. The second torque value is determined using a second set of powertrain measurements measured at a second time prior to the first time. One of the first torque value and the second torque value is then selected based on the first cost value and the second cost value.

18 Claims, 4 Drawing Sheets

U.S. PATENT DOCUMENTS

| | | |
|---|---|---|
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |

| | | | | | |
|---|---|---|---|---|---|
| 2009/0118932 | A1 | 5/2009 | Heap | | |
| 2009/0118933 | A1 | 5/2009 | Heap | | |
| 2009/0118934 | A1 | 5/2009 | Heap | | |
| 2009/0118935 | A1 | 5/2009 | Heap | | |
| 2009/0118936 | A1 | 5/2009 | Heap | | |
| 2009/0118937 | A1 | 5/2009 | Heap | | |
| 2009/0118938 | A1 | 5/2009 | Heap | | |
| 2009/0118939 | A1 | 5/2009 | Heap | | |
| 2009/0118940 | A1 | 5/2009 | Heap | | |
| 2009/0118941 | A1 | 5/2009 | Heap | | |
| 2009/0118942 | A1 | 5/2009 | Hsieh | | |
| 2009/0118943 | A1 | 5/2009 | Heap | | |
| 2009/0118944 | A1 | 5/2009 | Heap | | |
| 2009/0118945 | A1 | 5/2009 | Heap | | |
| 2009/0118946 | A1 | 5/2009 | Heap | | |
| 2009/0118947 | A1 | 5/2009 | Heap | | |
| 2009/0118948 | A1 | 5/2009 | Heap | | |
| 2009/0118949 | A1 | 5/2009 | Heap | | |
| 2009/0118950 | A1 | 5/2009 | Heap | | |
| 2009/0118951 | A1 | 5/2009 | Heap | | |
| 2009/0118952 | A1 | 5/2009 | Heap | | |
| 2009/0118954 | A1 | 5/2009 | Wu | | |
| 2009/0118957 | A1 | 5/2009 | Heap | | |
| 2009/0118962 | A1 | 5/2009 | Heap | | |
| 2009/0118963 | A1 | 5/2009 | Heap | | |
| 2009/0118964 | A1 | 5/2009 | Snyder | | |
| 2009/0118969 | A1 | 5/2009 | Heap | | |
| 2009/0118971 | A1 | 5/2009 | Heap | | |
| 2009/0118999 | A1 | 5/2009 | Heap | | |
| 2009/0144002 | A1 | 6/2009 | Zettel | | |

* cited by examiner

METHOD FOR CONTROLLING INPUT TORQUE PROVIDED TO A TRANSMISSION

CROSS REFERENCE TO RELATED APPLICATION

This application claims the benefit of U.S. Provisional Application No. 60/984,928 filed on Nov. 2, 2007 which is hereby incorporated herein by reference.

TECHNICAL FIELD

This disclosure is related to hybrid vehicle torque control systems.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electro-mechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A method for controlling an input torque provided to a transmission includes executing a first iterative search within a first range of permissible torque values to determine a first torque value based on a first cost value. The first cost value is based on a first set of powertrain measurements measured at a first time. A second cost value based on a second torque value and the first set of powertrain measurements measured at the first time is calculated. The second torque value is determined using a second set of powertrain measurements measured at a second time prior to the first time. One of the first torque value and the second torque value is then selected based on the first cost value and the second cost value.

BRIEF DESCRIPTION OF THE DRAWINGS

One or more embodiments will now be described, by way of example, with reference to the accompanying drawings, in which.

DETAILED DESCRIPTION

Figure 1:
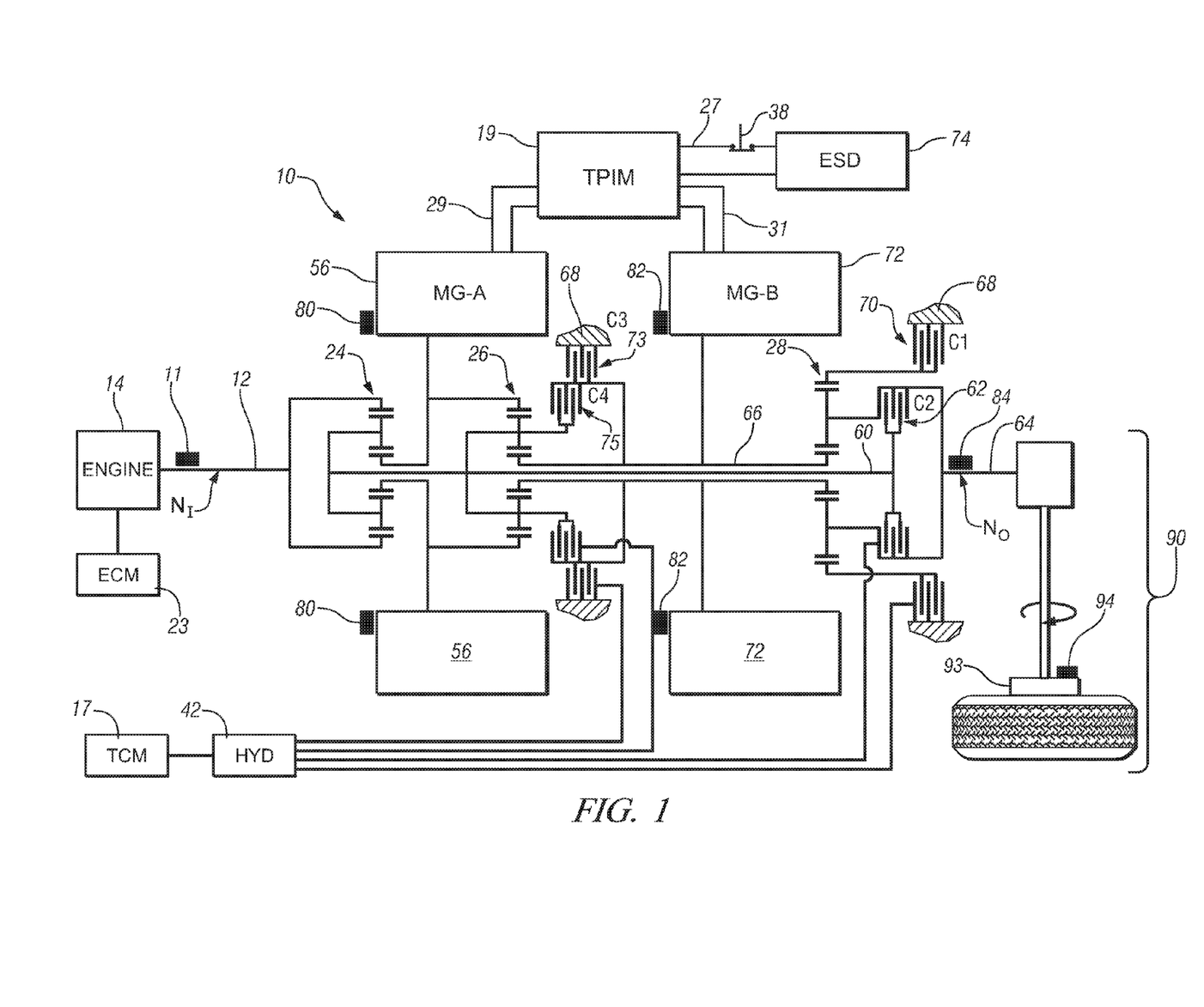
FIG. 1 is a schematic diagram of an exemplary powertrain, in accordance with the present disclosure.
Figure 2:
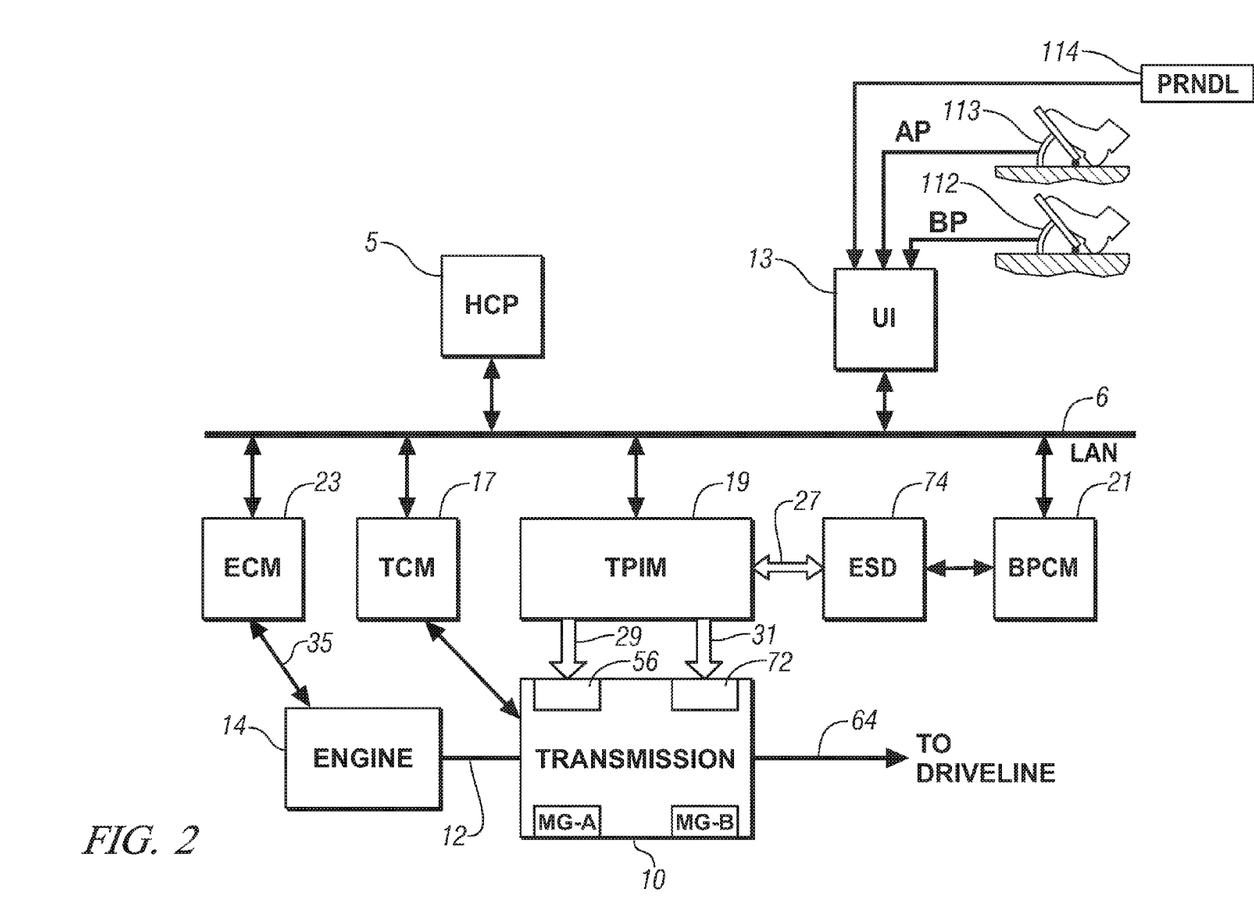
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electro-mechanical hybrid powertrain in accordance with the present disclosure is depicted in FIG. 1, comprising a two-mode, compound-split, electro-mechanical hybrid transmission 10 operatively connected to an engine 14 and first and second electric machines ('MG-A') 56 and ('MG-B') 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and output torque, can differ from the input speed, $N_I$, and the input torque, $T_I$, to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power, e.g., to vehicle wheels 93, one of which is shown in FIG. 1. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS\text{-}WHL}$, the output of which is monitored by a control module of a distributed control module system described with respect to FIG. 2, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque commands for the first and second electric machines 56 and 72 to achieve the input torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to achieve the input torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via respective ones of the transfer conductors 29 and 31 and transform it to or from three-phase AC power, which is conducted to or from the first and second electric machines 56 and 72 for operation as motors or generators.

FIG. 2 is a schematic block diagram of the distributed control module system. The elements described hereinafter comprise a subset of an overall vehicle control architecture, and provide coordinated system control of the exemplary powertrain described in FIG. 1. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electro-mechanical hybrid powertrain. The devices include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request ('$T_{O\_REQ}$'), a commanded output torque ('$T_{CMD}$') to the driveline 90, an engine input torque command, clutch torques for the torque-transfer clutches C1 70, C2 62, C3 73, C4 75 of the transmission 10; and the torque commands for the first and second electric machines 56 and 72, respectively. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

Each of the control modules ECM 23, TCM 17, TPIM 19 and BPCM 21 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and serial peripheral interface buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the powertrain. Alternatively, algorithms may be executed in response to the occurrence of an event.

The exemplary powertrain selectively operates in one of several operating range states that can be described in terms of an engine state comprising one of an engine on state ('ON') and an engine off state ('OFF'), and a transmission state comprising a plurality of fixed gears and continuously variable operating modes, described with reference to Table 1, below.

TABLE 1

| Description | Engine State | Transmission Operating Range State | Applied Clutches | |
|---|---|---|---|---|
| MI_Eng_Off | OFF | EVT Mode I | C1 70 | |
| MI_Eng_On | ON | EVT Mode I | C1 70 | |
| FG1 | ON | Fixed Gear Ratio 1 | C1 70 | C4 75 |
| FG2 | ON | Fixed Gear Ratio 2 | C1 70 | C2 62 |
| MII_Eng_Off | OFF | EVT Mode II | C2 62 | |
| MII_Eng_On | ON | EVT Mode II | C2 62 | |
| FG3 | ON | Fixed Gear Ratio 3 | C2 62 | C4 75 |
| FG4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode I, or MI, is selected by applying clutch C1 70 only in order to "ground" the outer gear member of the third planetary gear set 28. The engine state can be one of ON ('MI_Eng_On') or OFF ('MI_Eng_Off'). A second continuously variable mode, i.e., EVT Mode II, or MII, is selected by applying clutch C2 62 only to connect the shaft 60 to the carrier of the third planetary gear set 28. The engine state can be one of ON ('MII_Eng_On') or OFF ('MII_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$, is achieved. A first fixed gear operation ('FG1') is selected by applying clutches C1 70 and C4 75. A second fixed gear operation ('FG2') is selected by applying clutches C1 70 and C2 62. A third fixed gear operation ('FG3') is selected by applying clutches C2 62 and C4 75. A fourth fixed gear operation ('FG4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine the commanded output torque, $T_{CMD}$, intended to meet the operator torque request, $T_{O\_REQ}$, to be executed at the output member 64 and transmitted to the driveline 90. Final vehicle acceleration is affected by other factors including, e.g., road load, road grade, and vehicle mass. The operating range state is determined for the transmission 10 based upon a variety of operating characteristics of the powertrain. This includes the operator torque request, communicated through the accelerator pedal 113 and brake pedal 112 to the user interface 13 as previously described. The operating range state may be predicated on a powertrain torque demand caused by a command to operate the first and second electric machines 56 and 72 in an electrical energy generating mode or in a torque generating mode. The operating range state can be determined by an optimization algorithm or routine which determines preferred system efficiency based upon operator demand for power, battery state of charge, and energy efficiencies of the engine 14 and the first and second electric machines 56 and 72.

The HCP 5 manages input torque from the engine 14 and the first and second electric machines 56 and 72 using a result of a method for controlling input torque described below, and system efficiencies are optimized thereby, to manage fuel economy and battery charging. The HCP 5 monitors the torque-generative devices, and determines the power output from the transmission 10 required to achieve the desired output torque to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transmit power therebetween to generate a power flow to the output member 64.

Figure 3:
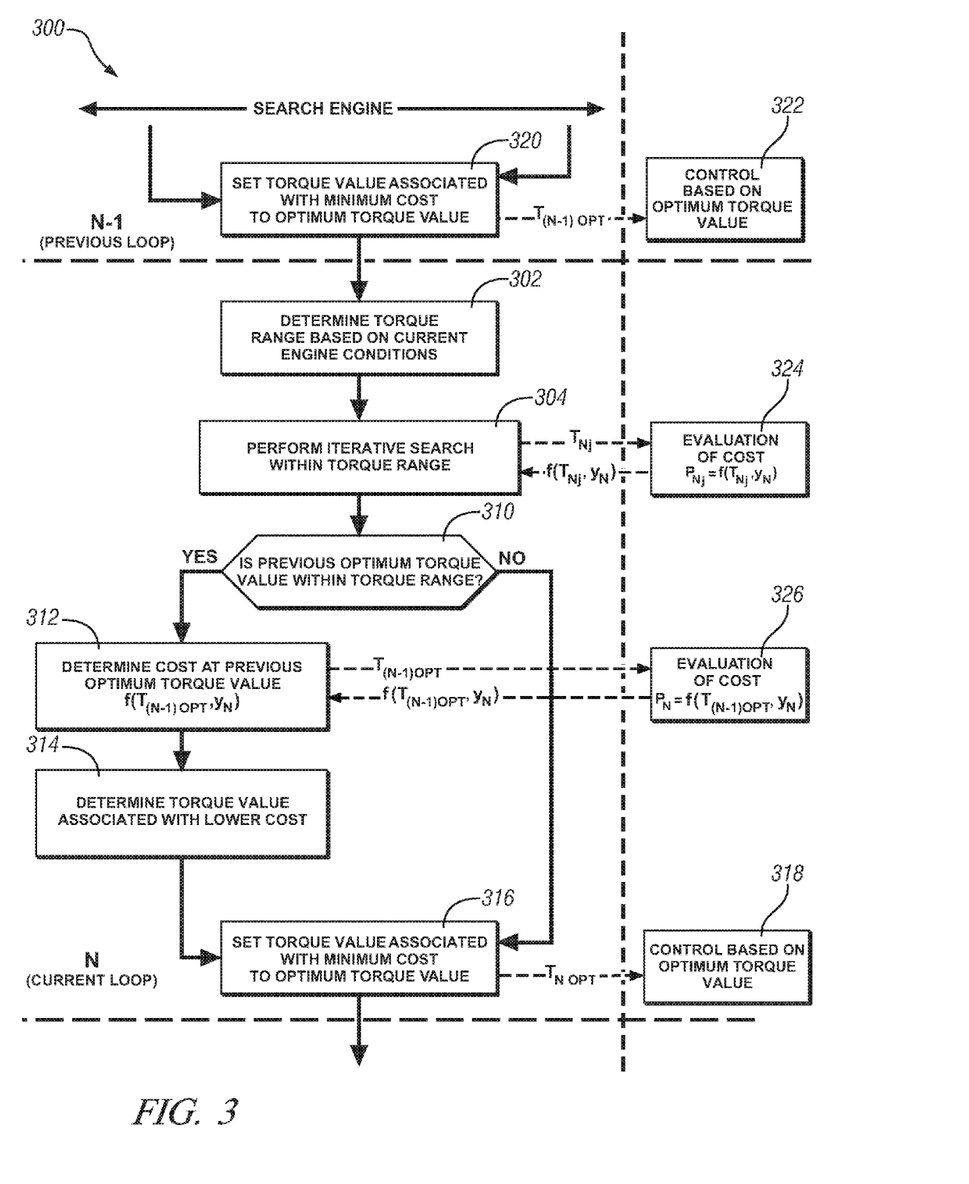
FIG. 3 is a process flow diagram of a method for controlling an input torque provided to a hybrid vehicle transmission, in accordance with an exemplary embodiment of the present disclosure.

Referring to FIG. 3, a method 300 for controlling the input torque $T_I$ provided to the transmission 10 is now described. As used herein, search loops will be associated with times "N", "N+1" and "N−1". Search loop N refers to a search loop executed by the HCP 5 at time N. Search loop N−1 refers to a search loop executed immediately prior to the search loop N. Search loop N+1 refers to a search loop executed immediately after the search loop N. Each search loop includes a number of iterations designated by "n". Further, "j" refers to a specific iteration within a search loop and ranges in value from 1 to n.

The method determines a "preferred torque value". The term "preferred torque value" as used herein for the search run N designates a torque value with a lowest cost associated therewith among torque value candidates of the search loop N or a preferred torque value $T_{(N-1)OPT}$ determined during the search loop N−1.

For search loop N−1, the HCP 5 sets a torque value associated with a minimum cost to the preferred input value $T_{(N-1)OPT}$ (320), and the HCP 5 controls engine torque based on the preferred torque value $T_{(N-1)OPT}$ (322). The process used by the HCP 5 in setting a torque value candidate associated with minimum cost to the preferred torque value $T_{(N-1)OPT}$ (320) and in controlling input torque based on $T_{(N-1)OPT}$ (322) is described in further detail in reference to steps 316 and 318 for the search loop N below.

Further, when $T_{(N-1)OPT}$ is determined, $T_{(N-1)OPT}$ is sent to a buffer of the HCP storage medium (not shown). The buffer stores the preferred torque value $T_{(N-1)OPT}$ for utilization in the search loop N.

Steps 302, 304, 310, 312, 314, 316, 318 and 324 are steps of the search loop N.

The HCP 5 determines a permissible torque range (302) $T_{N\_MIN}$ to $T_{N\_MAX}$. The minimum and maximum permissible torque values $T_{N\_MIN}$ and $T_{N\_MAX}$ are based on current operating conditions of the engine 14 and on ambient conditions. For example, engine speed can be measured and utilized to determine the minimum and maximum permissible torque values $T_{N\_MIN}$ and $T_{N\_MAX}$.

The minimum and maximum permissible torque values $T_{N\_MIN}$ and $T_{N\_MAX}$ comprise practical constraints associated with the specific engine configuration, and are based upon operating characteristics of the specific engine used, with the limits related to, for example, maximum torque output and combustion stability.

The HCP 5 performs an iterative search within the permissible torque range $T_{N\_MIN}$ to $T_{N\_MAX}$, to find a search result torque value $T_{N\_SEARCH}$ (304). The iterative search utilizes a search engine (not shown). The search engine determines torque value candidates using a golden section search. The golden section search engine divides the permissible torque range from $T_{N\_MIN}$ to $T_{N\_MAX}$ into golden sections where the smaller golden section to larger golden section ratio is $\phi$ or $(-(1+\sqrt{5})/2)$ to determine a first torque candidate values $(T_{Nj})$, where j=1 and a second torque candidate values $(T_{Nj})$, where j=2.

The first and second torque value candidates $T_{Nj}$ are inputted in evaluation of cost (324). A cost determination function $f(T_{Nj}, y_N)$ determines a cost $P_{Nj}$ associated with the torque value candidates $T_{Nj}$ and with an input value $y_N$ based on a set of powertrain measurements. In particular, the input value $y_N$ is based on the set of powertrain measurements measured at the time of the search run N. Thus, the cost $P_{Nj}$ is determined as a function $f(T_{Nj}, y_N)$.

The cost $P_{Nj}$ is indicative of a total powertrain system loss. In one embodiment, the cost determination function generally determines costs based on value $y_N$, which is based on a set of powertrain measurements related to fuel economy, emissions, and battery life. Furthermore, lower operating costs are generally associated with lower battery power usage, and lower emissions for an operating point, and take into account a current operating range state of the powertrain system. In one embodiment, the total powertrain system loss includes an overall system power loss and a cost penalty, such as can be associated with controlling battery state of charge. The total powertrain system loss comprises a term based upon losses in the electrical system (e.g. wire impedances and switching and solenoid losses), and heat losses. Other losses include electrical machine power losses and internal battery power losses. In other embodiments, other powertrain measurements may also be considered in determining operating cost, including powertrain measurements related to battery life due to depth of discharge of the ESD 74, and the effect on state of charge of the battery. Operating costs are developed relative to specific powertrain/vehicle applications.

The evaluation of cost (324) is separated from the iterative search (304) such that the search engine selects torque value candidates based on outputs from the evaluation of cost 324. A result of the function $f(T_{Nj}, y_N)$ is sent back to the iterative search 304 and the search engine uses the result to further divide golden sections into golden subsections to determine a new torque candidate value $T_{Nj}$ where j=3.

The iterative search 304 and the evaluation of cost 304 continue to iteratively determine torque value candidates $T_{Nj}$ until a selected number of iterations are performed. In particular, the search engine searches for 9 iterations. The search result torque value $T_{N\_SEARCH}$ is associated with the lowest cost determined during the iterative search. The tolerance level associated with a torque value candidate at the ninth iteration step is preferably less than +/−6 Newton-meters.

In alternative embodiments, the search engine performs other numbers of iterations. For example, in one alternative embodiment, the search engine performs fifteen iterations.

Further, in other alternative embodiments, the search engine performs iterations for an elapsed period of time or until a selected search tolerance level is reached.

In alternative exemplary embodiments, other search functions can be utilized. For example, other one-dimensional search functions such as Fibonacci search functions and like search functions can be utilized.

The cost associated with search result torque value $T_{N\_SEARCH}$ from the evaluation of cost $f(T_{N\_SEARCH}, Y_N)$ is utilized in step 314 where it is compared with the cost of the preferred torque of the previous search run N−1 evaluated at current powertrain measurements as described in further detail below.

The HCP 5 determines whether the preferred torque value $T_{(N-1)OPT}$ from the previous search run is within the range of permissible values based on engine conditions at time N (310). In particular, the HCP 5 determines whether the preferred torque value $T_{(N-1)OPT}$ is within the permissible torque range from $T_{N\_MIN}$ to $T_{N\_MAX}$.

If $T_{(N-1)OPT}$ is within the permissible torque range of $T_{N\_MIN}$ to $T_{N\_MAX}$, the HCP 5 then proceeds to step 312. If $T_{(N-1)OPT}$, is not within the range of $T_{N\_MIN}$ to $T_{N\_MAX}$, then the HCP 5 proceeds to step 316.

A cost function of 326 is utilized to calculate a cost $P_N$ based on the preferred torque value $T_{(N-1)OPT}$ and the input value based on the set of powertrain measurements $Y_N$ (312). The input value based on the set of powertrain measurements $Y_N$ is based on the set of powertrain measurements measured at time N. Thus, the cost is calculated utilizing $f(T_{(N-1)OPT}, Y_N)$.

The HCP 5 compares torque costs calculated by $f(T_{N\_SEARCH}, Y_N)$ and $f(T_{(N-1)OPT}, Y_N)$ to determine which of the search result torque value $T_{N\_SEARCH}$ or previous loop preferred torque value $T_{(N-1)OPT}$, has the lowest cost associated therewith (314).

The preferred torque value $T_{OPT}$ is set to either the search result torque value $T_{N\_SEARCH}$ or previous loop preferred torque value $T_{(N-1)OPT}$ (316). In particular, if the previous loop preferred torque value $T_{(N-1)OPT}$ is not in the permissible torque range of $T_{N\_MIN}$ to $T_{N\_MAX}$ (step 310), then the preferred torque value $T_{OPT}$ is set to the search result torque value $T_{N\_SEARCH}$. If the previous loop preferred torque value $T_{(N-1)OPT}$, is in the permissible torque range of $T_{N\_MIN}$ to $T_{N\_MAX}$, then the preferred torque value $T_{OPT}$ is set to either the search result torque value $T_{N\_SEARCH}$ or the previous loop preferred torque value $T_{(N-1)OPT}$ based on the torque value having the lowest cost associated therewith as determined in step 314.

Figure 4:
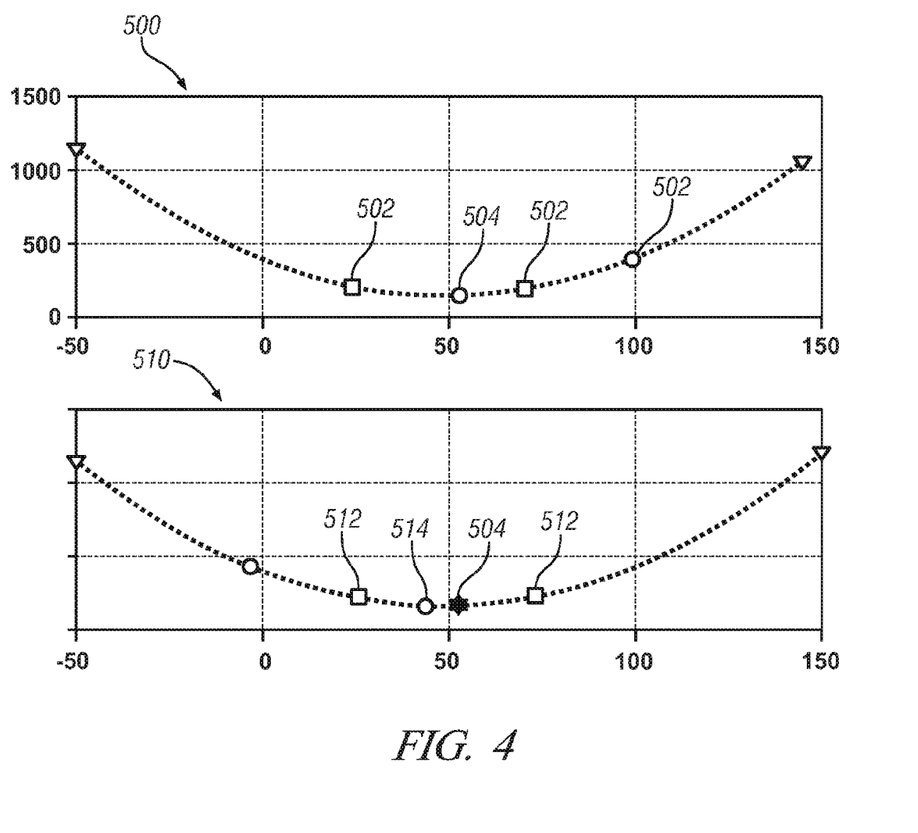
FIG. 4 is a graphical representation of an iterative search, in accordance with an exemplary embodiment of the present disclosure.

The method 300 is graphically depicted in FIG. 4. In particular, FIG. 4 shows graph 500 and graph 510. Graph 500 illustrates the iterative search of search loop N−1 wherein the torque values are depicted on the x-axis and the cost values are depicted on the y-axis. Graph 510 illustrates the iterative search of search loop N−1 where the torque values are depicted on the x-axis and the cost values at time N−1 are depicted on the y-axis.

Graph 500 includes torque value candidates 502 and preferred torque value $T_{(N-1)OPT}$ 504. Graph 510 shows torque value candidates 512 and search result torque value $T_{N\_SEARCH}$ 514. Further, graph 510 shows preferred torque value $T_{(N-1)OPT}$ 504 with respect to the evaluated cost at time N. Thus, graph 510 illustrates the cost comparison step 314 of the method 300 where the torque value associated with the lowest cost function at time N of $T_{N\_SEARCH}$ or $T_{(N-1)OPT}$ is determined based on the lowest cost value.

Referring again to FIG. 3, the HCP 5 controls the input torque (318). In particular, the HCP 5 sets the input torque $T_I$ to the preferred torque value $T_{N\_OPT}$, and the HCP 5 inputs the input torque $T_I$ to a system equation function, from which state values for first electric machine 56 motor torque $T_A$ and second electric machine 72 motor torque $T_B$ are determined. The torque relationship between the first electric machine 56 motor torque $T_A$ and the second electric machine motor torque 72 $T_B$ is as defined in Eqs 1 and 2, below:

$$T_B = [d_{11} \ d_{12} \ d_{13} \ d_{14}] * \begin{bmatrix} T_I \\ T_A \\ T_O \\ \dot{N_I} \end{bmatrix} \quad [1]$$

$$T_A = [g_{11} \ g_{12} \ g_{13} \ g_{14}] * \begin{bmatrix} T_I \\ T_B \\ T_O \\ \dot{N_I} \end{bmatrix} \quad [2]$$

wherein the input torque $T_I$ is originating from engine 14, The transmission output torque $T_O$ is output at the shaft 64, i.e., the requested output torque, $T_{O\_REQ}$, $T_A$ and $T_B$ are the operating torques for the first electric machine 56 and the second electric machine 72, $N^*_I$ represents time-rate change in transmission input speed $N_I$, and $d_{11}$, $d_{12}$, $d_{13}$, $d_{14}$, and $g_{11}$, $g_{12}$, $g_{13}$, $g_{14}$ are known scalar values determined for each of the fixed gears of the specific application.

The HCP 5 utilizing the method 300 determines the value for input torque $T_I$ rapidly due to the separation of the iterative search 304 and the evaluation of cost 324. In particular, the iterative search 304 quickly determines torque value candidates and provides each candidate to the evaluation of cost 324 such that the evaluation of cost only has to solve for one unknown variable per iterative step. The HCP 5 utilizing the method 300 determines the value for input torque $T_I$ in less than 25 milliseconds.

By comparing the cost for the previous loop preferred torque value $T_{(N-1)OPT}$ to the search result torque value $T_{N\_SEARCH}$ when determining the preferred torque value $T_{OPT}$, the method 300, provides stability in maintaining the previous loop preferred torque value $T_{(N-1)OPT}$ when desirable thereby decreasing variation in the preferred torque value $T_{OPT}$. Further, by comparing the cost for the previous loop preferred torque value $T_{(N-1)OPT}$ to the search result torque value $T_{N\_SEARCH}$, the method 300 can reduce the probability of search failures associated with local minima within the permissible torque range of $T_{N\_MIN}$ to $T_{N\_MAX}$.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling an input torque provided to a transmission, said method comprising:

executing a first iterative search within a first range of permissible torque values to determine a first torque value based on a first cost value, the first cost value being based on a first set of powertrain measurements measured at a first time;

calculating a second cost value based on a second torque value and the first set of powertrain measurements measured at the first time, the second for torque value being determined using a second set of powertrain measurements measured at a second time, the second time being prior to the first time; and selecting one of the first torque value and the second torque value based on the first cost value and the second cost value;

wherein the first search function executes less than ten iteration steps; and wherein at a ninth iteration step a torque value candidate tolerance level is less than +/−6 Newton-meters.

2. The method of claim 1, further comprising controlling operation of an engine to achieve the selected input torque.

3. A method for controlling an input torque provided to a transmission, said method comprising:

executing a first iterative search within a first range of permissible torque values to determine a first torque value associated with a first cost value, said first range of permissible torque values being based on a first engine condition measurement measured at a first time, said first cost value being based on a first set of powertrain measurements measured at the first time;

executing a second iterative search function within a second range of permissible torque values to determine a second torque value associated with a second cost value, said second range of permissible torque values being based on a second engine condition measurement measured at a second time, said second cost value being based on a second set of powertrain measurements measured at the second time;

calculating a third cost value using the first torque value, the third cost value being based on the second set of powertrain measurements;

selecting either the first torque value or the second torque value based on the second cost value and the third cost value; and controlling operation of an engine to achieve the selected one of the first and second torque values.

4. The method of claim 3, wherein the first iterative search comprises a one-dimensional search function.

5. The method of claim 3, further comprising executing the first iterative search in a microprocessor wherein the first iterative search execution occurs over a time period of 25 milliseconds or less.

6. The method of claim 3, wherein the first iterative search executes less than ten iteration steps.

7. The method of claim 3, wherein selecting either the first torque value or the second torque value comprises selecting the one of the first and second torque values associated with the smallest cost value based on the first set of powertrain measurements at the first time.

8. The method of claim 3, wherein the selected one of the first and second torque values is the first torque value.

9. The method of claim 3, further comprising calculating a first motor torque value and a second motor torque value based on the selected one of the first and second torque values.

10. The method of claim 3, wherein the first cost value is a lowest cost value calculated when executing the first iterative search.

11. The method of claim 3, wherein the first range of permissible torque values is based on an engine condition measurement measured at the first time.

12. The method of claim 11, further comprising determining whether the second torque value is within the first range of permissible torque values.

13. The method of claim 11, wherein the engine condition measurement is based on an engine speed measurement.

14. The method of claim 3, wherein the first set of powertrain measurements measured at the first time includes a powertrain measurement selected from the group consisting of a drivability level measurement, a fuel economy level measurement, an emission level measurement, and a battery charge level measurement.

15. The method of claim 3, wherein the first time is 25 milliseconds or less after the second time.

16. A method for controlling an input torque provided to a transmission, said method comprising:

iteratively determining a first torque value based on a first cost value at a first time, and a second torque value based on a second cost value at a second time;

calculating a third cost value at the second time based on the first torque value; and selecting either the first torque value or the second torque value based on a lower cost value at the second time.

17. The method of claim 16, further comprising controlling operation of an engine to achieve the selected one of the first and second torque values.

18. The method of claim 16, wherein the first cost value is based on a set of powertrain measurements.

* * * * *